US009952971B2

(12) United States Patent
Krishnaprasad et al.

(10) Patent No.: US 9,952,971 B2
(45) Date of Patent: *Apr. 24, 2018

(54) DISTRIBUTED CACHE ARRANGEMENT

(71) Applicant: Microsoft Technology Licensing, LLC, Redmond, WA (US)

(72) Inventors: Muralidhar Krishnaprasad, Redmond, WA (US); Anil K. Nori, Redmond, WA (US); Subramanian Muralidhar, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 60 days.

This patent is subject to a terminal disclaimer.

(21) Appl. No.: 14/600,732

(22) Filed: Jan. 20, 2015

(65) Prior Publication Data
US 2015/0134911 A1   May 14, 2015

Related U.S. Application Data

(63) Continuation of application No. 12/363,505, filed on Jan. 30, 2009, now Pat. No. 8,943,271.
(Continued)

(51) Int. Cl.
*G06F 12/08* (2016.01)
*G06F 12/0811* (2016.01)
(Continued)

(52) U.S. Cl.
CPC ...... *G06F 12/0811* (2013.01); *G06F 12/0813* (2013.01); *G06F 12/0833* (2013.01); *G06F 12/121* (2013.01); *G06F 2212/283* (2013.01)

(58) Field of Classification Search
CPC ............. G06F 12/0811; G06F 12/0833; G06F 12/0813; G06F 12/121; G06F 12/02;
(Continued)

(56) References Cited

U.S. PATENT DOCUMENTS 5,220,604 A   6/1993 Gasser et al.
5,261,069 A   11/1993 Wilkinson et al.
(Continued)

FOREIGN PATENT DOCUMENTS

CN   1458597 A   11/2003
CN   1763719 A   4/2006
(Continued)

OTHER PUBLICATIONS

The State Intellectual Property Office of the People's Republic of China, Decision on Reexamination, Application/Patent No. 200980122471.7, dated Mar. 23, 2016, 9 Pages.
(Continued)

*Primary Examiner* — Michael Krofcheck
(74) *Attorney, Agent, or Firm* — David Chin; Chin IP, PLLC

(57) ABSTRACT

Systems and methods that aggregate memory capacity of multiple computers into a single unified cache, via a layering arrangement. Such layering arrangement is scalable to a plurality of machines and includes a data manager component, an object manager component and a distributed object manager component, which can be implemented in a modular fashion. Moreover, the layering arrangement can provide for an explicit cache tier (e.g., cache-aside architecture) that applications are aware about, wherein decision are made explicitly which objects to put/remove in such applications (as opposed to an implicit cache wherein application do not know the existence of the cache).

20 Claims, 10 Drawing Sheets

Related U.S. Application Data

(60) Provisional application No. 61/061,017, filed on Jun. 12, 2008.

(51) Int. Cl.
    *G06F 12/0813* (2016.01)
    *G06F 12/0831* (2016.01)
    *G06F 12/121* (2016.01)

(58) Field of Classification Search
    CPC ............ G06F 12/084; G06F 2212/283; G06F 2212/69; G06F 2212/154
    See application file for complete search history.

(56) References Cited

U.S. PATENT DOCUMENTS

| | | | |
|---|---|---|---|
| 5,394,531 | A | 2/1995 | Smith |
| 5,548,506 | A | 8/1996 | Srinivasan |
| 5,634,053 | A | 5/1997 | Noble et al. |
| 5,734,898 | A | 3/1998 | He |
| 5,878,218 | A | 3/1999 | Maddalozzo, Jr. et al. |
| 6,026,413 | A | 2/2000 | Challenger et al. |
| 6,026,464 | A | 2/2000 | Cohen |
| 6,321,240 | B1 | 11/2001 | Chilimbi et al. |
| 6,341,311 | B1 | 1/2002 | Smith et al. |
| 6,487,562 | B1 | 11/2002 | Mason, Jr. et al. |
| 6,553,465 | B1 | 4/2003 | Takusagawa |
| 6,587,921 | B2 | 7/2003 | Chiu et al. |
| 6,591,347 | B2 * | 7/2003 | Tischler ............... G06F 12/121 711/128 |
| 6,654,771 | B1 | 11/2003 | Parham et al. |
| 6,772,178 | B2 | 8/2004 | Mandal et al. |
| 6,823,377 | B1 | 11/2004 | Wu et al. |
| 6,901,410 | B2 | 5/2005 | Marron et al. |
| 6,922,757 | B2 | 7/2005 | Frank et al. |
| 6,973,546 | B2 | 12/2005 | Johnson |
| 7,249,219 | B1 | 7/2007 | Mowat et al. |
| 7,275,142 | B1 | 9/2007 | Schultz et al. |
| 7,334,062 | B1 | 2/2008 | Agarwal et al. |
| 7,370,064 | B2 | 5/2008 | Yousefi'zadeh |
| 7,457,918 | B2 | 11/2008 | Marwinski et al. |
| 7,464,400 | B2 | 12/2008 | Jindani et al. |
| 7,509,424 | B2 | 3/2009 | Okazaki |
| 7,617,369 | B1 | 11/2009 | Bezbaruah et al. |
| 7,698,239 | B2 | 4/2010 | Lieuallen et al. |
| 7,698,301 | B2 | 4/2010 | Lourdeaux |
| 8,117,156 | B2 | 2/2012 | Krishnaprasad et al. |
| 8,151,062 | B2 | 4/2012 | Krishnaprasad et al. |
| 2001/0028364 | A1 | 10/2001 | Fredell et al. |
| 2002/0178119 | A1 | 11/2002 | Griffin et al. |
| 2003/0028819 | A1 | 2/2003 | Chiu et al. |
| 2003/0041214 | A1 | 2/2003 | Hirao et al. |
| 2003/0041215 | A1 | 2/2003 | George et al. |
| 2003/0187821 | A1 | 10/2003 | Cotton et al. |
| 2004/0073596 | A1 | 4/2004 | Kloninger et al. |
| 2004/0153576 | A1 | 8/2004 | Hansmann et al. |
| 2004/0221105 | A1 | 11/2004 | Fujimoto et al. |
| 2005/0081097 | A1 | 4/2005 | Bacher et al. |
| 2005/0097440 | A1 | 5/2005 | Lusk et al. |
| 2005/0132030 | A1 | 6/2005 | Hopen et al. |
| 2005/0223028 | A1 | 10/2005 | Geiner et al. |
| 2006/0074894 | A1 | 4/2006 | Remahl et al. |
| 2006/0143256 | A1 * | 6/2006 | Galchev ............... G06F 12/084 |
| 2006/0143685 | A1 | 6/2006 | Vasishth et al. |
| 2006/0248124 | A1 | 11/2006 | Petev et al. |
| 2007/0055887 | A1 | 3/2007 | Cross et al. |
| 2007/0192542 | A1 | 8/2007 | Frolund et al. |
| 2007/0198478 | A1 | 8/2007 | Yu et al. |
| 2007/0208713 | A1 | 9/2007 | Krishnaprasad et al. |
| 2007/0226421 | A1 | 9/2007 | Hoang et al. |
| 2007/0233539 | A1 | 10/2007 | Suenderhauf et al. |
| 2007/0283443 | A1 | 12/2007 | McPherson et al. |
| 2008/0052102 | A1 | 2/2008 | Taneja et al. |
| 2008/0140962 | A1 | 6/2008 | Pattabiraman et al. |
| 2008/0141332 | A1 | 6/2008 | Treinen |
| 2008/0147988 | A1 | 6/2008 | Heller et al. |
| 2008/0244736 | A1 | 10/2008 | Lampson et al. |
| 2009/0043881 | A1 | 2/2009 | Alstad |
| 2009/0044259 | A1 | 2/2009 | Bookman et al. |
| 2009/0049312 | A1 | 2/2009 | Min |
| 2009/0144388 | A1 | 6/2009 | Gross et al. |
| 2009/0150511 | A1 | 6/2009 | Gross et al. |
| 2009/0271412 | A1 | 10/2009 | Lacapra et al. |
| 2009/0300154 | A1 | 12/2009 | Branson et al. |
| 2009/0313436 | A1 | 12/2009 | Krishnaprasad et al. |
| 2010/0106914 | A1 | 4/2010 | Krishnaprasad et al. |
| 2010/0293332 | A1 | 11/2010 | Krishnaprasad et al. |
| 2010/0293333 | A1 | 11/2010 | Krishnaprasad et al. |
| 2010/0293338 | A1 | 11/2010 | Krishnaprasad et al. |
| 2014/0359056 | A1 | 12/2014 | Mani et al. |

FOREIGN PATENT DOCUMENTS

| | | |
|---|---|---|
| EP | 0926608 A2 | 6/1999 |
| EP | 0926608 B1 | 10/2004 |
| EP | 1647908 A2 | 4/2006 |
| WO | WO2009000276 A1 | 12/2008 |

OTHER PUBLICATIONS

Guyer, et al. "Finding Your Cronies: Static Analysis for Dynamic Object Colocation" Retrieved at <<http:www.cs.utexas.edu/-sammy/cronies-oopsla-2004.pdf>> in the proceedings of the 19th annual ACM SIGPLAN conference on object-oriented programming, systems, languages, and applications, Oct. 24-28, 2004. 14 pages.

Bordvedt, Jerry, "Functional Specification for Object Caching Service for Java (OCS4J), 2.0", Retrieved at <<http://jcp.org/aboutJava/communityprocess/jsr/cacheFS.pdf>> Aug. 9, 2000, pp. 1-27.

"GemFire Architectural Overview", Undated but believed to have been retrieved at <<http://developer.gemstone.com/display/gfedevITopologies+and+Architectures+for+Middle-Tier+Caching>> in about Feb. 2009, 7 pages.

Bhatti, et al. "Evaluation of Different Open Source Identity Management Systems", Retrieved at <<http://www.ida.liu.set-TDDD17/0ldprojects/2007/projects/13.pdf>>, 11 pages.

Guru, et al. "A Template-Based Conceptual Modeling Infrastructure for Simulation of Physical Security Systems", Retrieved at <<http://www.informs-sim.org/wsc04papers/109.pdf>> Proceedings of the 2004 Winter Simulation Conference, pp. 866-873.

Chirkova, et al. "Cache Invalidation and Propagation in Distributed Caching" Retrieved at <<ftp:llftp.ncsu.edu/pub/unity/lockerslftp/csc_anon/tech/2005/TR-2005-07.pdf>>>, 2005, pp. 1-39.

Cao, et al. "Data Inconsistency for Cooperative Caching in Mobile Evironments" Retrieved at <<http://ieeexplore.ieee.org/stamp/stamp.jsp?arnumber=04160225>> Published by the IEEE Computer Society, 2007 IEEE, 7 pages.

Kohli, et al. "Cache Invalidation and Update Propagation in Distributed Caches" Retrieved at <<http://dbgroup.ncsu.edu/rychirko/Papers/KohliC05.pdf>>, Jun. 2005,5 pages.

Franklin, et al. "Transactional Client-Server Cache Consistency: Alternatives and Performance" Retrieved at <<http://www.cs.binghamton.edu/-shadi/cmp/papers/tcscc.pdf>>, ACM Transactions on Database Systems, vol. 22, No. 3, Sep. 1997, 49 pages.

"Intelligent Caching" Retrieved at <<http://www.alachisoft.com/ncache/intelligent_cache.html>>, copyright notice 2008, 3 pages.

"Oracle9iAS TopLink CMP for Users of BEA WebLogic Guide" Retrieved at <<http://download-uk.oracle.com/docs/cd/A97688_16/toplink.903/b1 0065/clusteri.htm>> on Mar. 19, 2009, Part No. B10065-01, 6 pages.

International Search Report dated Dec. 30, 2009, for PCT Application Serial No. PCT/US2009/044259, 11 pages.

"General Concepts (Velocity)" Retrieved at <<http://msdn.microsoft.com/en-us/library/dd169078(printer).aspx>> Feb. 9, 2009, 7 pages.

(56) References Cited

OTHER PUBLICATIONS

"Java Object Cache" Retrieved at <<http://www.deakin.edu.au/its/dba/oracle-doco/9.0.4.1/9.0.4_doc_library/web.904/b10326/objcache.htm>> Feb. 9, 2009, pp. 1-44.
GemFire Enterprise Architectural Overview Release 5.0 Retrieved at <<http://www.gemstone.com/pdf/GemFire_Architectural.pdf>> Copyright Date 2006, pp. 72.
Yang, Jiong; Nittel, Sylvia; Wang, Wei; Muntz, Richard. "DynamO: Dynamic Objects with Persistent Storage," Department of Computer Science, University of California, Los Angeles, California. Retrieved online at [http://www.cs.unc.edu/-weiwang/paper/pos98.ps] on Jul. 21, 2008, 16 Pages.
Microsoft Project Codename"Velocity," retrieved online at [http://download.microsoft.com/download/a/1/5/a156ef5b-5613-4e4c-8d0a-33c9151 bbef5/Microsoft_Project_Velocity-Datasheet, pdf] on Jul. 21, 2008, 2 Pages.
Berardi, Nick, "Posts Tagged 'Distributed Cache'", The Codeer Journal, retrieved online at [http://www.coderjournal.com/tags/distributed-cache/] on Jul. 21, 2008, 3 Pages.
Decoro, Christopher; Langston, Harper;Weinberger, Jeremy. "Cash: Distributed Cooperative Buffer Caching," Courant Institute of Mathematical Sciences, New York University. Retrieved online at [http://cs.nyu.edu/~harper/papers/cash.pdf] on Jul. 21, 2008, 7 Pages.
Office Action, U.S. Appl. No. 12/465,667, filed May 14, 2009, Notification dated Aug. 29, 2011, pp. 14.
Notice of Allowance, U.S. Appl. No. 12/465,667, filed May 14, 2009, dated Dec. 5, 2011, pp. 17.
Office Action, U.S. Appl. No. 12/465,677, filed May 14, 2009, Notification dated Jul. 14, 2011, pp. 20.
European Search Report, Application No. 09763165.9-1229, Reference EP72967TE900kap, dated Jan. 16, 2012, pp. 7.
The State Intellectual Property Office of the People's Republic of China, Office Action, Application/Patent No. 200980122471.7, dated Sep. 21, 2012, pp. 9.
Office Action, U.S. Appl. No. 12/433,841, filed Apr. 30, 2009, Office Action Notification dated Oct. 7, 2011, pp. 9.
Notice of Allowance and Fee(s) Due, U.S. Appl. No. 12/433,841, filed Apr. 30, 2009, dated Dec. 2, 2011, pp. 9.
Skobeltsyn, et al., "Distributed Cache Table: Efficient Query-Driven Processing of Multi-Term Queries in P2P Networks", Retrieved from <<http://lsirpeople.epfl.ch/aberer/PAPERS/p2pir10-Skobeltsyn%202006.pdf>>, Nov. 11, 2006, 8 Pages.
Misek, Rob, "Partitioned Cache Service", Retrieved from <<http://coherence.oracle.com/display/COH34UG/Partitioned+Cache+Service>>, Last Edited on Sep. 15, 2008, 5 Pages.
Bolotin, et al., "The Power of Priority: NoC based Distributed Cache Coherency", Retrieved from <<http://www.ee.technion.ac.il/matrics/papers/The%20Power%20of%20Priority.pdf>>, 2007, 10 Pages.
Lavakishan, et al., "Distributed Shared Memory and Case Study of the Midway Distributed Shared Memory System", Retrieved from <<www.uta.edu/cse/levine/aos/reports/etha_paper.doc>>, 1992, 21 Pages.
Thomas et al., "Architecture of the Ficus Scalable replicated file system", Mar. 1991, 18 Pages.
Yu, et al., "Consistent and Automatic Replica Regeneration", http://www.comp.nus.edu.sg/-yuhf/nsdi04final/nsdi04.pdf. Last accessed Nov. 11, 2008, 14 Pages.
Intransa, Inc., "Understanding Controller-based Replication vs. Host-based Replication", 2005, http://www.ppma.com/IntransaWhitePaper/All/controller_vs_host.pdf, Last accessed Nov. 11, 2008, 4 Pages.
Grimm, et al., "Revisiting Structured Storage: A Transactional Record Store", http://pages.cs.wisc.edu/-swifit/papers/tr00-04-01.pdf. Last accessed Nov. 11, 2008, 13 Pages.
"Data Sharing Solutions", http://www.informatik.uni-leipzig.de/ti/os390/book/os390/filesyst/filesys 1.pdf, Last accessed Nov. 11, 2008, 8 Pages.
The State Intellectual Property Office of the People's Republic of China, Office Action, Application/Patent No. 200980122471.7, dated Apr. 4, 2014, 12 Pages.
Office Action, U.S. Appl. No. 12/420,364, filed Apr. 30, 2009, Notification dated Aug. 8, 2011, 10 Pages.
"Office Action received for European Patent Application No. 09763165.9", dated Jul. 16, 2014, 3 Pages.
The State Intellectual Property Office of the People's Republic of China, Office Action with English language translation of the summary of the Office Action, Chinese Application/Patent No: 200980122471.7, dated Jul. 29, 2014, 6 Pages.
"Final Office Action Issued in U.S. Appl. No. 12/363,505", dated Dec. 19, 2011, 17 Pages.
"Non Final Office Action Issued in U.S. Appl. No. 12/363,505", dated Jul. 22, 2011, 12 Pages.
"Non Final Office Action Issued in U.S. Appl. No. 12/363,505", dated Jun. 5, 2013, 17 Pages.
"Notice of Allowance Issued in U.S. Appl. No. 12/363,505", dated Sep. 29, 2014, 8 Pages.
"Notice of Allowance Issued in U.S. Appl. No. 12/363,505", dated Nov. 14, 2014, 2 Pages.
"Second Office Action Issued in Chinese Patent Application No. 200980122471.7", dated Apr. 3, 2013, 7 Pages.
"Third Office Action Issued in Chinese Patent Application No. 200980122471.7", dated Sep. 27, 2013, 9 Pages.
"Notice of Grant Issued in Chinese Patent Application No. 200980122471.7", dated Apr. 20, 2017, 7 Pages.
"Office Action Issued in European Patent Application No. 09763165.9", dated Nov. 14, 2017, 4 Pages.

\* cited by examiner

DISTRIBUTED CACHE ARRANGEMENT

RELATED APPLICATIONS

The present application is a continuation of U.S. application Ser. No. 12/363,505, filed Jan. 30, 2009 entitled "DISTRIBUTED CACHE ARRANGEMENT", which claims the benefit of U.S. Provisional Application No. 61/061,017 filed on Jun. 12, 2008 entitled "DISTRIBUTED CACHE", both of which are incorporated herein by reference. If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

BACKGROUND

Increasing advances in computer technology (e.g., microprocessor speed, memory capacity, data transfer bandwidth, software functionality, and the like) have generally contributed to increased computer application in various industries. Ever more powerful server systems, which are often configured as an array of servers, are often provided to service requests originating from external sources such as the World Wide Web, for example.

Typically, a continuing problem in computer systems remains handling the growing amount of information or data available. The sheer amount of information being stored on disks or other media for databases in some form has been increasing dramatically. While files and disks were measured in thousands of bytes a few decades ago—at that time being millions of bytes (megabytes), followed by billions of bytes (gigabytes)—now databases of a million megabytes (terabytes) and even billions of megabytes are being created and employed in day-to-day activities.

Moreover, various forms of storage devices allow information to be held over relatively a long period without information degradation. A common storage medium is flash memory; specifically, flash memory is a non-volatile form of storage that retains information without drawing upon a constant source of power. Such type of memory is often employed in a variety of consumer electronic devices such as memory cards, universal serial bus (USB), flash drives, personal data assistants (PDAs), digital audio players, digital cameras, mobile phones, and so forth.

Another common type of non-volatile storage medium is a magnetic disk, which enables information to be recorded according to a magnetization pattern. Similar to other storage media, magnetic disks can be configured in a variety of manners (e.g., Magneto resistive Random Access Memory) as well as employed in many different applications. This type of storage device is commonly used in connection with databases and analog recordings. Likewise, volatile forms of storage exist that provide certain benefits that may also be accompanied by particular disadvantages. For example, retrieval times for volatile media are generally faster than that for non-volatile media, and many operations have increased uniformity due to well-established standards.

Moreover, today applications run on different tiers, in different service boundaries, and on different platforms (e.g. server, desktop, devices). For example, in a typical web application, many applications reside on a server supporting a large number of users; however, some client components of the application may run on desktops, mobile devices, and web browsers, and the like. Furthermore, advances in connectivity and cheap storage combined with the complexity of software management facilitate on-line services and software-as-a-service. In such services models, applications (and associated data) are typically hosted in central data centers (also sometimes referred to as the 'cloud') and are accessible and shared over the web.

The distributed applications require support for large number of users, high performance, throughput and response time. Such services orientation also requires the cost of service to be low, thereby requiring the scalability and performance at low cost.

A further challenge in implementing storage systems is support for distribution and heterogeneity of data and applications. Applications are composing (e.g. mashups) data and business logic from sources that can be local, federated, or cloud-based. Composite applications require aggregated data to be shaped in a form that is most suitable for the application. Data and logic sharing is also an important requirement in composite applications.

As explained earlier, data and applications can reside in different tiers with different semantics and access patterns. For example, data in back-end servers/clusters or in the cloud tends to be authoritative; data on the wire is message-oriented; data in the mid-tier is either cached data for performance or application session data; data on the devices could be local data or data cached from back-end sources. With the costs of memory going down, considerably large caches can be configured on the desktop and server machines. With the maturity of 64-bit hardware, 64-bit CPUs are becoming mainstream for client and server machines. True 64-bit architectures support 64-bit CPUs, data or address buses, virtual addressability and dramatically increase memory limits (to $2^{34}$ bytes). Operating systems (e.g. Windows, Linux) are also upgraded to support and take advantage of 64 bit address-space and large memories. For example, desktops can be configured with 16 GB RAM, and servers can be configured with up to 2 TB of RAM. Large memory caches allow for data to be located close to the application, thereby providing significant performance benefits to applications. In addition, in a world where hundreds of gigabytes of storage is the norm, the ability to work with most data in memory (large caches) and easily shift from tables to trees to graphs of objects is the key to programmer productivity for next generation applications.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation enables aggregating memory capacity of multiple computers into a single unified cache, which can be scalable (e.g., a dynamic scaling) to a plurality of machines via a layering arrangement. Such layering arrangement can cache any serializable Common Language Runtime (CLR) object and provide access through simple cache application programming interface (API). The layering arrangement includes a data manager component, an object manager component and a distributed object manager component, which can be implemented in a modular fashion. In one aspect, the data manager component supplies basic data functions (e.g., hash functions), and the object manager component implements object facade thereon including cache objects—while the distributed object manager provides distribution of the data in the distributed cache. As such, the object manager component can map regions to containers and manage data eviction thresholds and supply policy management for cached data. Such regions can represent cache containers that typically guarantee co-locations of the object placed/inserted in the container (e.g., co-locations of objects in same node). Additionally, the object manager component can raise notifications (e.g., due to changes made to cached data) for various regions or objects of the distributed cache. Likewise, the distributed object manager component can dispatch requests to various nodes associated with different regions of the distributed cache. Moreover, such distributed object manager interfaces with partition maps of the distributed cache for a given request; and facilitates abstraction of the aggregated cache in the distributed environment, to a single unified cache. In one aspect, the distributed object manager component is positioned on top of the object manager component, which itself is placed on top of the data manager component. Moreover, tight integration can be provided with ASP.NET to enable cache ASP.NET session data in the cache without having to write it to source databases, for example.

Such provides for pluggable features that can readily adapt to a user's need (e.g., replacing a data manger component with another type thereof, based on user requirements). Likewise, the object manager component can be replaced with another object manager component, wherein plugging different models in the layering arrangement is enabled by enabling a call back mechanism with holding locks during call back throughout the stack.

In a related aspect, the layering arrangement of the subject innovation provides for a modular arrangement that facilitates operation on different levels and communication substrates (e.g., TCP/IP), and which can be implemented in two topology models, namely as an independent separate tier model or an embedded application model. In the independent and separate tier model the caching layer functions as an independent separate tier by itself, (which can be positioned between application servers and data servers). For example, in such configuration the distributed cache runs as a service hosted either by Windows Activation Services (WAS) or windows service and runs separate from the application. The applications can either employ the client stubs provided by the distributed cache to talk thereto, or through Representational state transfer (REST) API directly into the service.

Alternatively, in the embedded application model the cache can be embedded with the application itself (e.g., connecting the applications together to form a cluster—such as embedding caches in ASP.net instances to form a cluster of ASP.net machines, wherein upon storing an item in a local cache it can be viewed from other machines). Such can further enable tagging and Language Integrated Query (LINQ) queries on the objects from a functionality perspective. LINQ queries can then be run natively on stored objects; and (can be embedded in .Net applications).

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
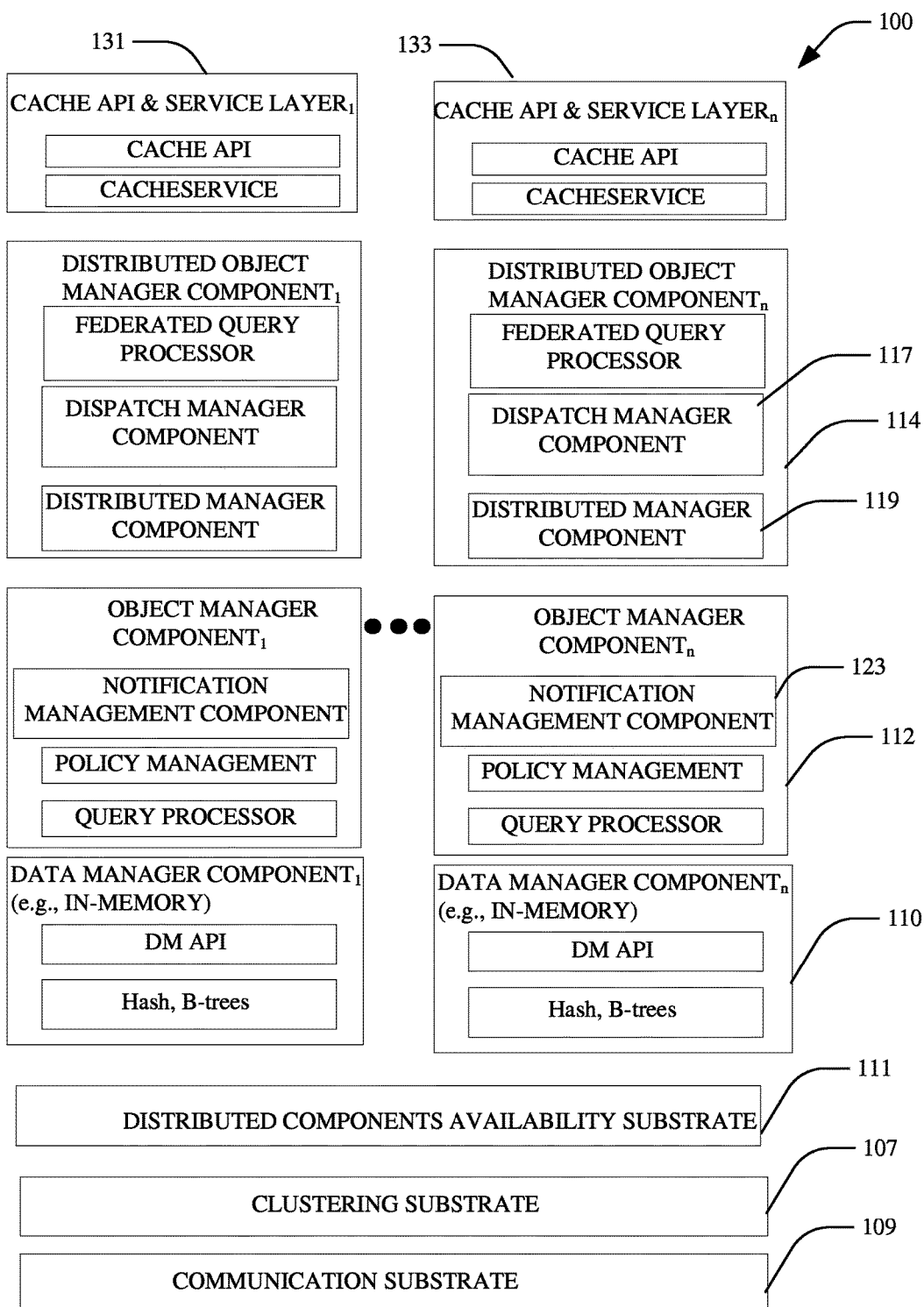
FIG. 1 illustrates an exemplary layering arrangement according to an aspect of the subject innovation.

FIG. 1 illustrates an exemplary layering arrangement that enables aggregating memory capacity of multiple computers into a single unified cache, according to an aspect of the subject innovation. Such layering arrangement 100 provides for a scalable system that can be tailored to different types of communication layers such as TCP/IP, and pluggable features can be further enabled for readily adapting to a user's need. The distributed cache implementing the layering arrangement 100 can dynamically scale itself with growth of applications associated therewith, by addition of additional computers as nodes to a cluster of machines. As illustrated in FIG. 1, each of the cache nodes 131, 133 (1 to n, n being an integer) the layering arrangement 100, which includes a data manager component 110, an object manager component 112 and a distributed object manager component 114—the set up which can be implemented in a modular fashion—wherein, the distributed object manager component 114 is positioned on top of the object manager component 112, which itself placed on top of the data manager component 110. The data manager component 110 supplies basic data functions (e.g., hash functions), and the object manager component 112 implements object facade thereon including cache objects with the distributed object manager component 114 providing the distribution. As such, the object manager component 112 and data manager component 110 can act as local entities, wherein the distributed object manager component 114 performs the distributions. Moreover, a clustering substrate can establish clustering protocols among the plurality of nodes that form the single unified cache. For example, when a node is to join or leave the cluster, requisite operation for adding or leaving the cluster are managed, wherein the distributed component availability substrate can employ such information to manage operation (e.g., monitoring health of nodes, managing life cycles of nodes, creating a primary node on another machine). In addition, for each node each of the components forming the layering arrangement can be pluggable based on user needs, system requirements, and the like.

As explained earlier, the data manager component 110 (e.g., in memory) provides primitive high performance data structures such as hash tables, Btrees, and the like. Since such data manager 110 is memory bound and all operations of the distributed cache of the subject innovation are atomic, it can typically implement highly concurrent hash tables. Such further facilitates creating the infrastructure for supplying containers and indexes on containers. In addition it provides simple eviction and expiration on these hash structures. It is to be appreciated that due to pluggable features supplied by the layering arrangement 100, users can plug in different types of data managers tailored to users' requirements such as; a transaction data manager or a disk paged data manager, and the like. Likewise, the object manager component 112 provides the object abstraction and implements the concept of named caches and region by employing data structures provided by the data manager.

Similarly, the distributed object manager component 114 employs the local object manager and integrates with the Distributed Components 111 to provide the abstraction of the distributed cache. Core to the distributed cache of the subject innovation is the Distributed Components/availability substrate 111 which provides the transport and data consistency operations to make the system scalable and available. The object distribution component can optionally be implemented as part of a client tier to facilitate dispatching requests (e.g., directly) to the nodes associated with the single unified cache.

In one particular aspect, the distributed object manager component 114 can further include a Dispatch Manager component 117 and a distributed Manager component 119. The Dispatch Manager component 117 can further look up the routing table to dispatch the requests to a primary node (e.g., where a region is located) as part of dynamically scalable distributed cache. Moreover, such dispatch manager component 117 can be also present in the client so that the client can directly dispatch requests to the primary node. For example, the distributed object manager 111 on the receiving node can interact with the partition map to check if the node is indeed designated as the primary node as part of a plurality of nodes associated with the distributed cache, and calls the Object Manager component 114 to perform the operation. In the case of write operations, such distributed object manager component 114 can also communicate with a replicator to replicate the data to the secondary nodes. It can also interact with the failover manager systems (not shown) to clone regions to create new secondary or primary nodes during reconfiguration procedures subsequent to possible failures.

The object manager component 112 can further include a notification management component 123 that tracks changes to regions and objects and relays notifications to delegates listening to those events. Moreover, applications can also register delegates for notifications on any node which may be different from the primary node on which the object resides. The distributed object manager component 114 can further manage the propagation of notifications in a distributed fashion including providing high availability for such notifications when the primary node fails. For example, such can be handled by maintaining a local lookup table indexed by delegate id on the node where the application registers the delegate. The primary node that stores the object maintains the delegate id and the originating node information. When such object changes in the distributed object manager component 114, the primary node can notify all the originating nodes passing along the delegate id.

Similarly, the distributed object manager component 114 associated with the receiver can employ the lookup table to call the appropriate delegate, thus providing the change information to the application in a distributed fashion. For example, notifications can be asynchronous and can further be backed up using the same secondary nodes. Accordingly, in the event of failures, the secondary nodes attempt to deliver the pending notifications, wherein during the primary node failure notifications can be resent—since the primary may not have synchronized the information regarding the delivered notifications before failure. Since all notifications carry the region, key and version information, application can use the version to ignore duplicate notifications.

Example—Region Level Callback

```
public delegate CacheCallback
elec_cbk = new CacheCallback( myclass.handler );
catalog.addCallback(nElectronicsRegion", elec cbk);
Callback called for any updates to region
```

Example—Object Level Callback

```
public delegate CacheitemRemovedCallback
elec cbk = new CacheitemRemovedCallback( ) ;
// Add the callback to the object ; the elec cbk delegate will be called
// whenever the object changes regardless of where the object is present
catalog.Add("ElectronicsRegion", "key", object, elec cbk);
```

Likewise, the Availability Substrate 111 provides scalability and availability to systems that contain a storage component associated with the distributed cache of the subject innovation. For example, the availability substrate can include load balancers, fail over managers, replicators and the like. Interacting with such availability substrate 111 is the communication substrate 109 that provides for failure detection of nodes and reliable message delivery therebetween. Moreover, the communication substrate 109 provides the communication channels and cluster management. Such communication substrate 109 can provide callbacks whenever a new node joins the cluster or when a node dies or fails to respond to exchanged messages (e.g., heart beat messages). Moreover, the communication substrate 109 can provide efficient point-to-point and multicast delivery channels, and can further provide reliable message delivery that is required for implementing the replication protocols. For example, the communication substrate 109 supports notifications by maintaining delegate information in cache items and triggering the notification when items are modified. Such component also triggers eviction based on policies defined at the region or named cache level.

Figure 2:
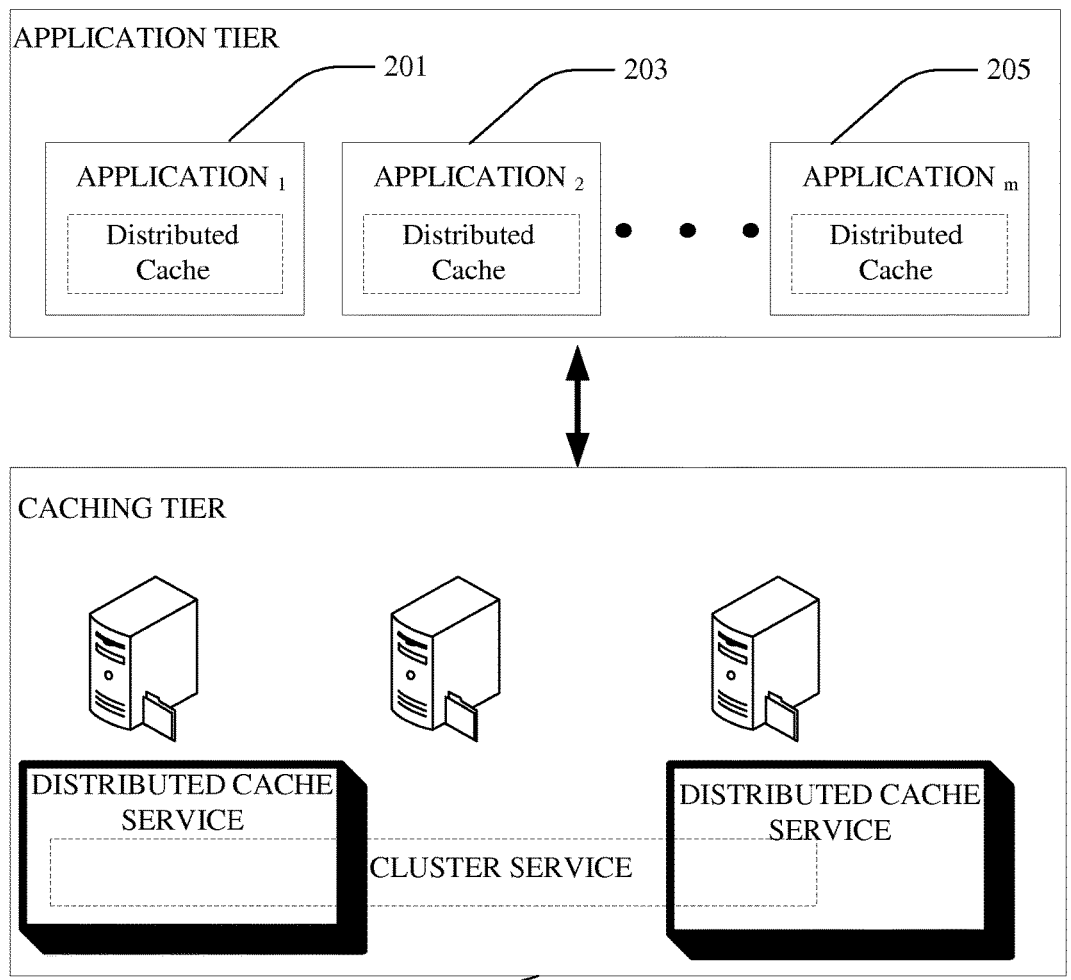
FIG. 2 illustrates a further topology model of a layering arrangement that relates to an independent separate tier model implementation, according to an exemplary aspect of the subject innovation.
Figure 3:
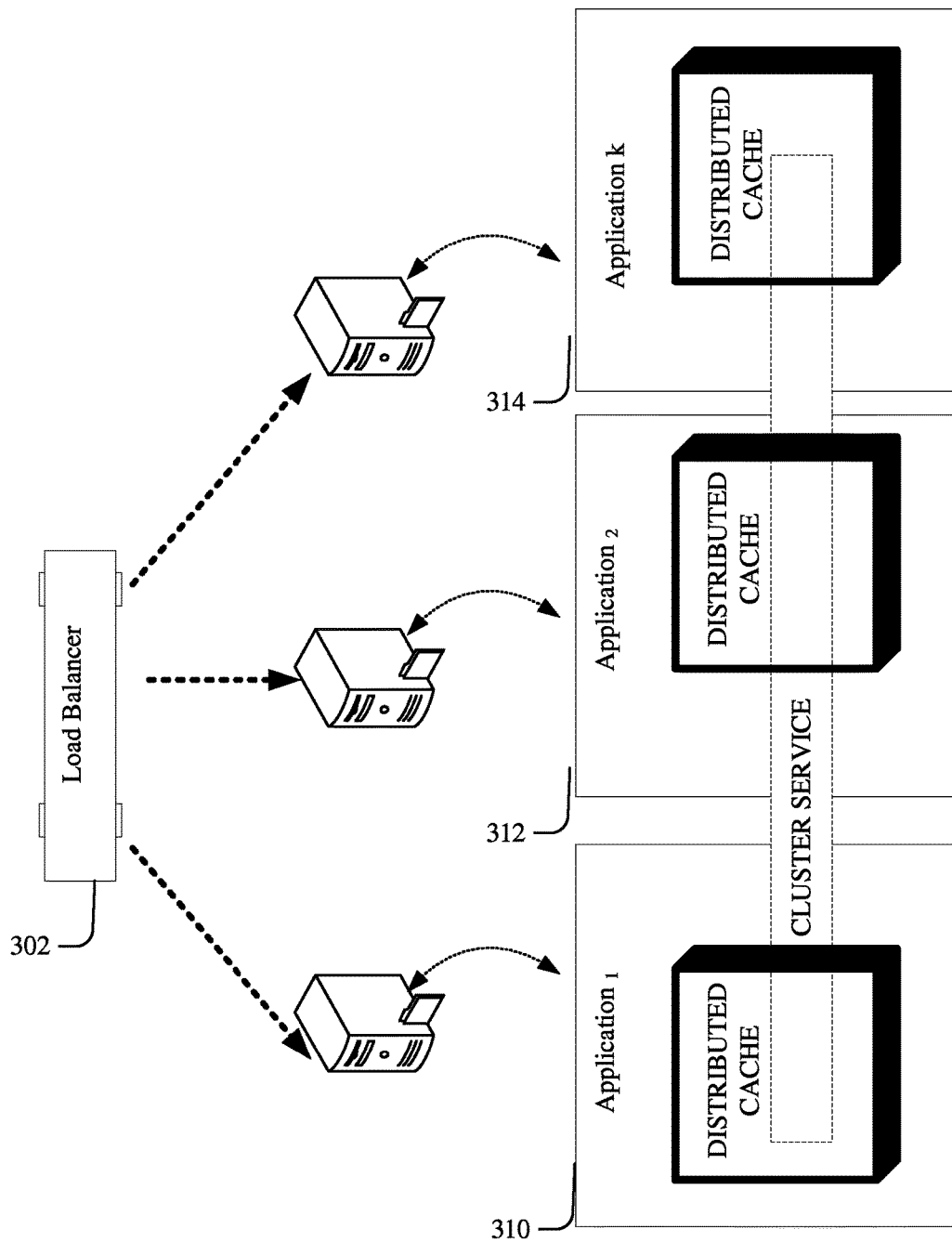
FIG. 3 illustrates a topology model of a layering arrangement that pertains to an embedded application model.

FIG. 2 and FIG. 3 illustrate two topology models, namely as an independent separate tier model, and an embedded application model respectively. According to one particular aspect, in the independent and separate tier model of FIG. 2, the caching tier 220 functions as an independent separate tier by itself, (which can be positioned between application servers and data servers). For example, in such configuration the distributed cache runs as a service hosted either by WAS or windows service and runs separate from the application. The applications 201, 203, 205 (1 to m, m being an integer) can either employ the client stubs provided by the distributed cache to talk thereto, or through Representational state transfer (REST) API directly into the service.

Alternatively, in the embedded application model the cache can be embedded with the application itself as illustrated in FIG. 3. Such can occur by connecting the applications 310, 312, 314 (1 to k, k being an integer) together to form a cluster; for instance as embedding caches in ASP.net instances to form a cluster of ASP.net machines, wherein upon storing an item in a local cache it can be viewed from other machines. For example, the distributed cache runtime dlls are compiled with the application and the application acts as the Cache Host for the distributed cache runtime. All the thread pools and memory come from the application's container.

In a related aspect, the Load Balancer 302 can dynamically redistribute load across the cluster in the event that one or more nodes are inundated. For example, data can be repartitioned to spread it to nodes that have less loads. All such nodes can periodically send their load status as part of the configuration metadata. The load balancer 302 also periodically queries the configuration to determine which nodes are overloaded and need to be balanced. For example, to distribute the load is to repartition the hot partition of data on the primary node and spread it to one (or more) of its secondary nodes. This requires a change in the configuration data (partition map) and no data movement (since the secondary nodes already have the data). In other scenarios, it may be required to distribute the data to other non-secondary nodes since the secondary nodes themselves might be loaded and cannot handle the additional node. In such cases, either the data partitions on the secondary nodes (for which this node is the primary) need to be further load balanced; or non-secondary nodes can be chosen to distribute the load, in which case in addition to the changes in the partition map, data will need to be moved.

Figure 4:
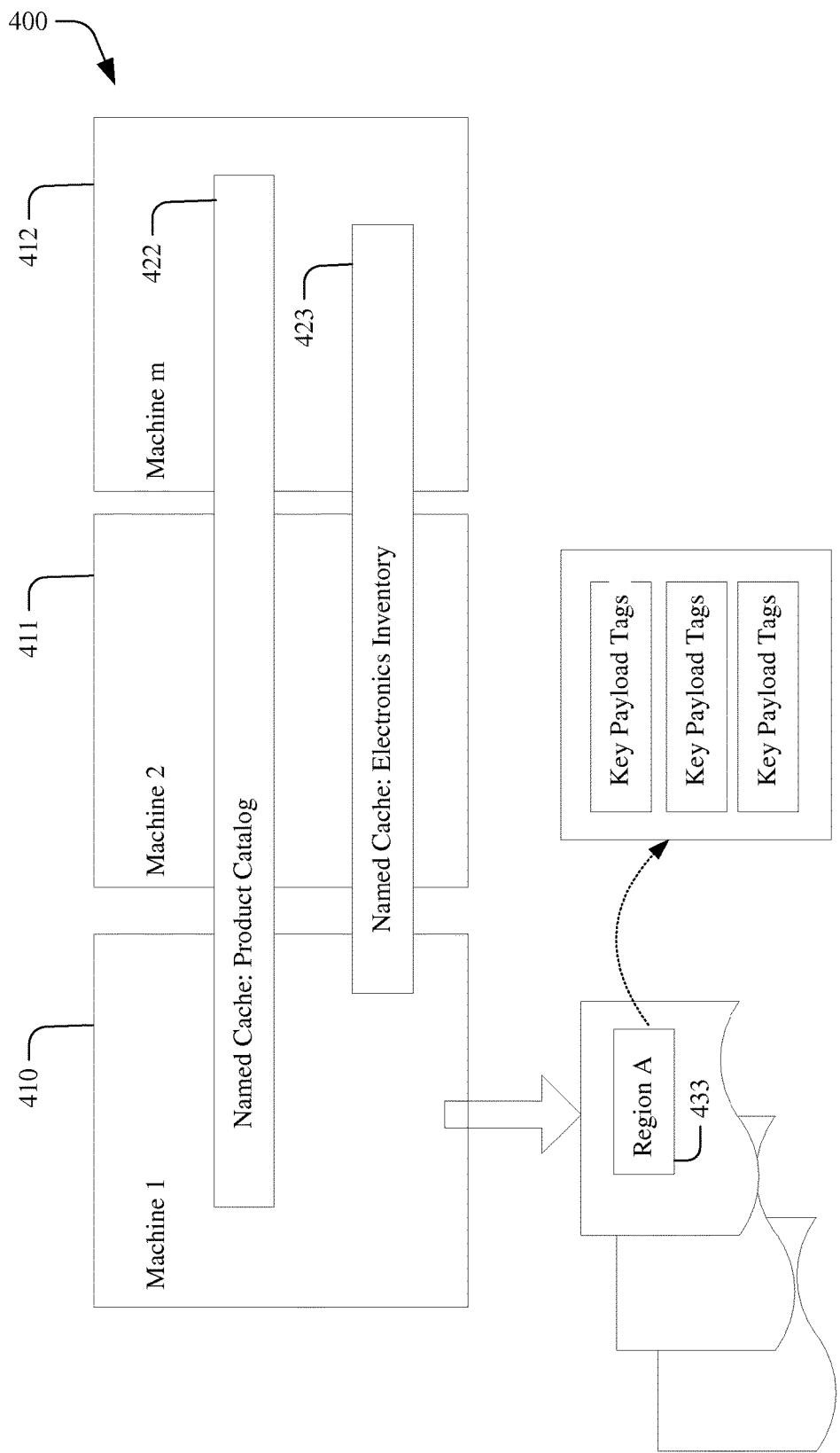
FIG. 4 illustrates a distributed cache that includes a runtime deployed on multiple machines according to a particular aspect of the subject innovation.

FIG. 4 illustrates a distributed cache 400 that consists of the runtime deployed on multiple machines 410, 411, 412 (1 to m, m being an integer) that from a cluster. On each machine 410, 411, 412 there can exist one or more runtime also called as "Cache Host". Each cache host 422, 423 hosts one or more named caches. The named caches can be configured in the distributed cache configuration file. Moreover, the named caches can be spread around all or a subset of the machines in the cluster. In addition, within each named cache there can exist one or more regions 433. Such regions can be implicitly created by the distributed cache or can be explicitly defined by the application. In general, all items in a region 433 can be guaranteed to be co-located on a cache host. Such can improve performance for operations that operate on multiple items in the region such as query and other set operations. Moreover, the node where a region is located can be deemed as the primary node of that region, wherein typically access to this region will be routed to the primary node for that region. If the named cache is configured to have "backups" for high availability, then one or more other nodes are chosen to contain a copy of this data. Such nodes are called secondary nodes for that region. All changes made to the primary node are also reflected on these secondary nodes. Thus if the primary node for a region fails, the secondary node can be used to retrieve the data without having to have logs written to disk.

The following is a code example that shows the creation of a named cache and region.

```
// CacheFactory class provides methods to return cache objects
// Create instance of cachefactory (readsappconfig)
CacheFactory fac = new CacheFactory( );
// Get a named cache from the factory
Cache catalog = fac.GetCache("catalogcache");
//--------------------------------------------------------
// Simple Get/Put
catalog.Put("toy-101", new Toy("thomas", .,.));
// From the same or a different client
Toy toyObj = (Toy)catalog.Get("toy-101");
// --------------------------------------------------------
// Region based Get/Put
catalog.CreateRegion("toyRegion");
// Both toy and toyparts are put in the same region
catalog.Put("toyRegion", "toy-101", new Toy( .,.));
Catalog.Put("toyRegion", "toypart-100", new ToyParts(..));
Toy toyObj = (Toy)catalog.Get("toyRegion", "toy-101");
```

Figure 5:
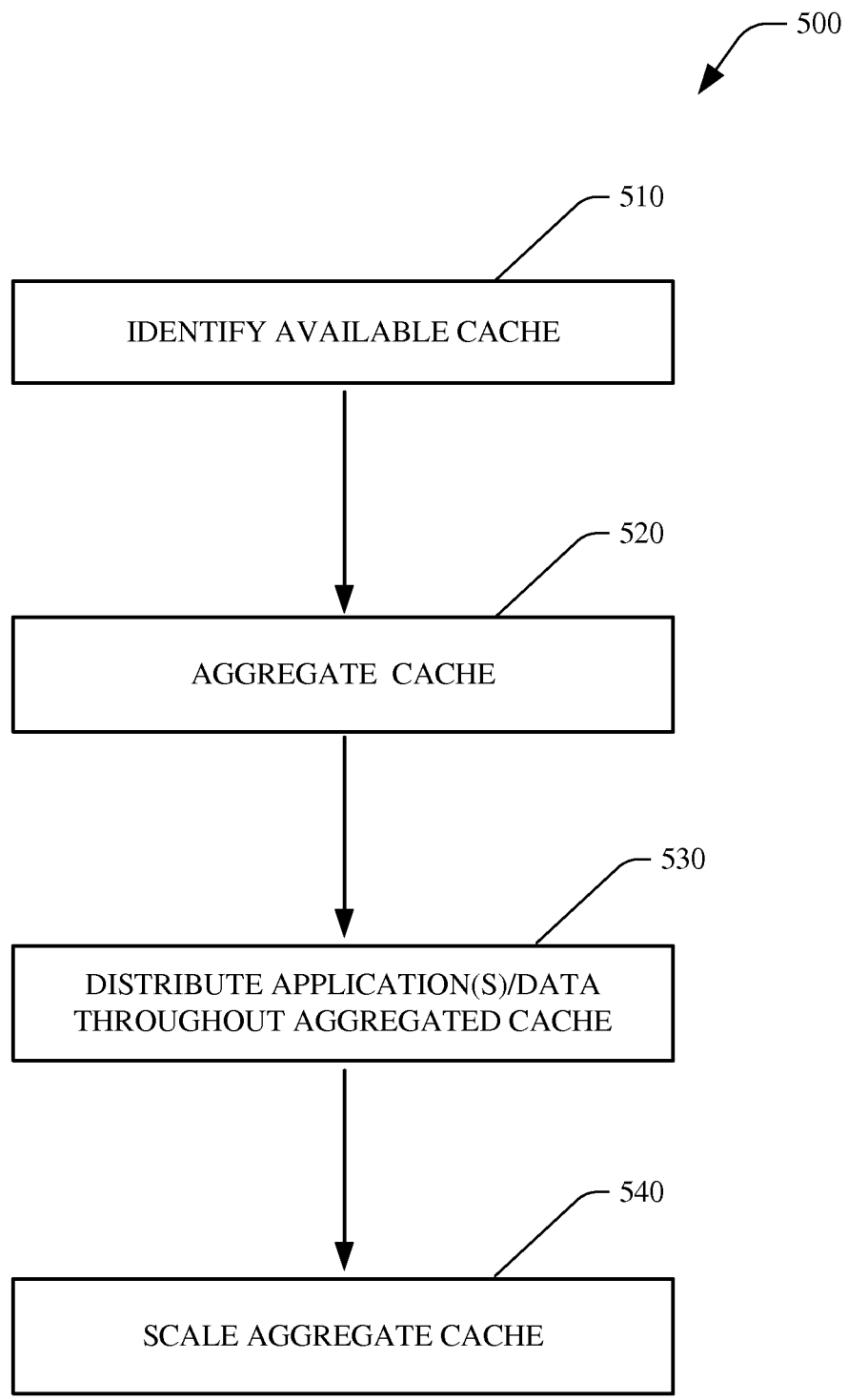
FIG. 5 illustrates a particular methodology of distributing cache according to an aspect of the subject innovation.

FIG. 5 illustrates a related methodology 500 of distributing cache according to a further aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 510, cache available to the system can be identified, wherein such cache can be scalable to a plurality of machines via a layering arrangement (e.g., dynamic scaling by adding new nodes). Subsequently, and at 520 such cache can be aggregated into a single unified cache as presented to a user thereof. At 530, applications/data can be distributed throughout such aggregated cache. Next, and at 540 the aggregated cache can be scaled depending on the changing requirement of the applications and/or data.

Figure 6:
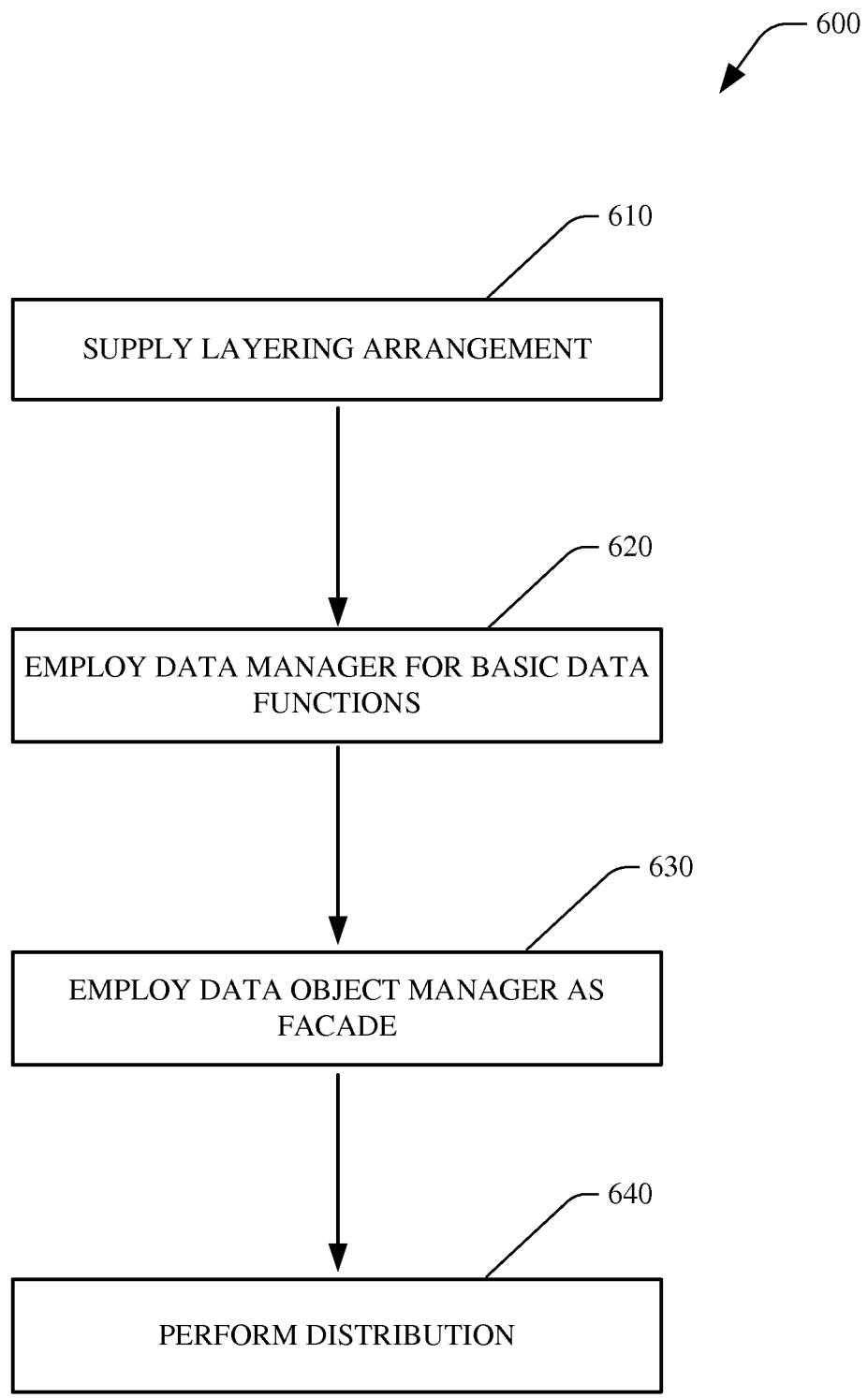
FIG. 6 illustrates a further methodology of implementing a layering arrangement for a distributed cache in accordance with an aspect of the subject innovation.

FIG. 6 illustrates a related methodology 600 of implementing a distributed cache via a layering arrangement according to an aspect of the subject innovation. Initially and at 610 a layering arrangement can be supplied that includes a data manager component, an object manager component and a distributed object manager component—the set up which can be implemented in a modular fashion; wherein, the distributed object manager component is positioned on top of the object manager component, which itself placed on top of the data manager component.

At 620, the data manager component supplies basic data functions (e.g., hash functions). Likewise, and at 630 the object manager component implements object facade thereon including cache objects with the distributed object manager component providing the distribution. As such, the object manager component and data manager component can act as local entities, wherein the distribution manager performs the distributions at 640.

Figure 7:
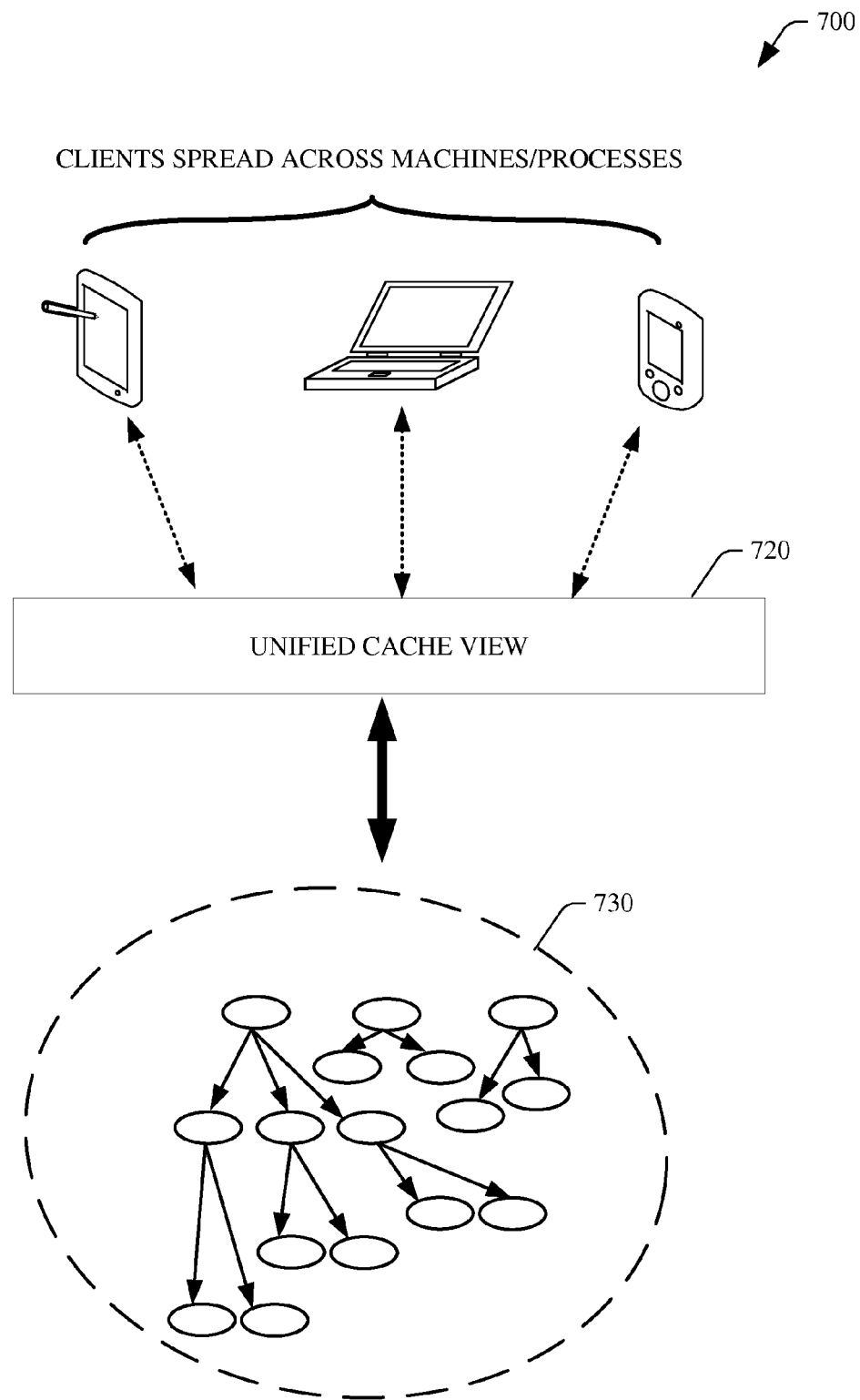
FIG. 7 illustrates an exemplary illustration of a unified cache view according to a further aspect.

FIG. 7 illustrates a further exemplary aspect of the subject innovation that illustrates a unified cache view 720 for clients spread across machines processes. Such system 700 provides an explicit, distributed, in-memory application cache for all kinds of data with consistency and query. Such data can reside in different tiers (in different service boundaries) with different semantics. For example, data stored in the backend database is authoritative and requires high degree of data consistency and integrity.

Typically, there tends to be single authoritative source for any data instance. Most data in the mid-tier, being operated by the business logic can tends to be copy of the authoritative data. Such copies are suitable for caching. As such, Understanding the different types of data and their semantics in different tiers defines the different degrees of caching that is possible.

REFERENCE DATA

Reference data is a version of the authoritative data. It is either a direct copy (version) of the original data or aggregated and transformed from multiple data sources. Reference data is practically immutable—changing the reference data (or the corresponding authoritative data) creates a new version of the reference data. That is, every reference data version is unique. Reference data is a candidate for caching; as the reference data does not change, it can be shared across multiple applications (users), thereby increasing the scale and performance. For example, a product catalog application aggregating product information across multiple backend application and data sources can be considered. Most common operation on the catalog data is read (or browse); a typical catalog browse operation iterates over a large amount of product data, filters it, personalizes it, and then presents the selected data to the users. Key based and query based access is a common form of operation. Caching is a critical requirement for catalog access. If not cached, operations against such an aggregate catalog require the operations to be decomposed into operations on the underlying sources, invoke the underlying operations, collect responses, and aggregate the results into cohesive responses. Accessing the large sets of backend data for every catalog operation can be prohibitively expensive, and can significantly impact the response time and throughput of the application. Caching the backend product data closer to the catalog application can significantly improve the performance and the scalability of the application. Similarly, aggregated flight schedules are another example of reference data. Referenced data can be refreshed periodically, usually at configured intervals, from its sources, or refreshed when the authoritative data sources change. Access to reference data, though shared, is mostly read. Local updates are often performed for tagging (to better organize the data). To support large scale, reference data can be replicated in multiple caches on different machines in a cluster. As mentioned above, reference data can be readily cached, and can provide high scalability.

Activity Data

Activity data is generated by the currently executing activity as part of a business transaction. Such data originates as part of the business transaction and eventually at the close of the business transaction, it is retired to the backend data source as historical (or log) information. For example, the shopping cart data in an online buying application can be considered. There is one shopping cart, which is exclusive, for each online buying session. During the buying session, the shopping cart is cached and updated with products purchased, wherein the shopping cart is visible and accessible only to the buying transaction. Upon checkout, once the payment is applied, the shopping cart is retired (from the cache) to a backend application for further processing. Once the business transaction is processed by the backend application, the shopping cart information is logged for auditing (and historical) purposes.

While the buying session is active, the shopping cart is accessed both for read and write; however it is not shared. This exclusive access nature of the activity data makes it suitable for distributed caching. To support large scalability of the buying application, the shipping carts can be distributed across the cluster of caches. Since the shopping carts are not shared, the set of shopping carts can be partitioned across the distributed cache. By dynamically configuring the distributed cache, the degree of scale can be controlled.

Resource Data

Both reference (shared read) and activity (exclusive write) data can be cached. It is to be appreciated that not all application data falls into these two categories. There is data that is shared, concurrently read and written into, and accessed by large number of transactions. For example, considering inventory management application, the inventory of an item has the description of the item and the current quantity. The quantity information is authoritative, volatile, and concurrently accessed by large number of users for read/write. Such data is known as the resource data; the business logic (e.g. the order application logic) runs close to the resource data (e.g. quantity data). The resource data is typically stored in the backend data stores. However, for performance reasons it is cached in the application tier. While caching the quantity data in memory on a single machine can provide performance improvements, a single cache cannot provide availability or scale when the order volume is high. Accordingly, the quantity data can be replicated in multiple caches across the distributed cache.

Figure 8:
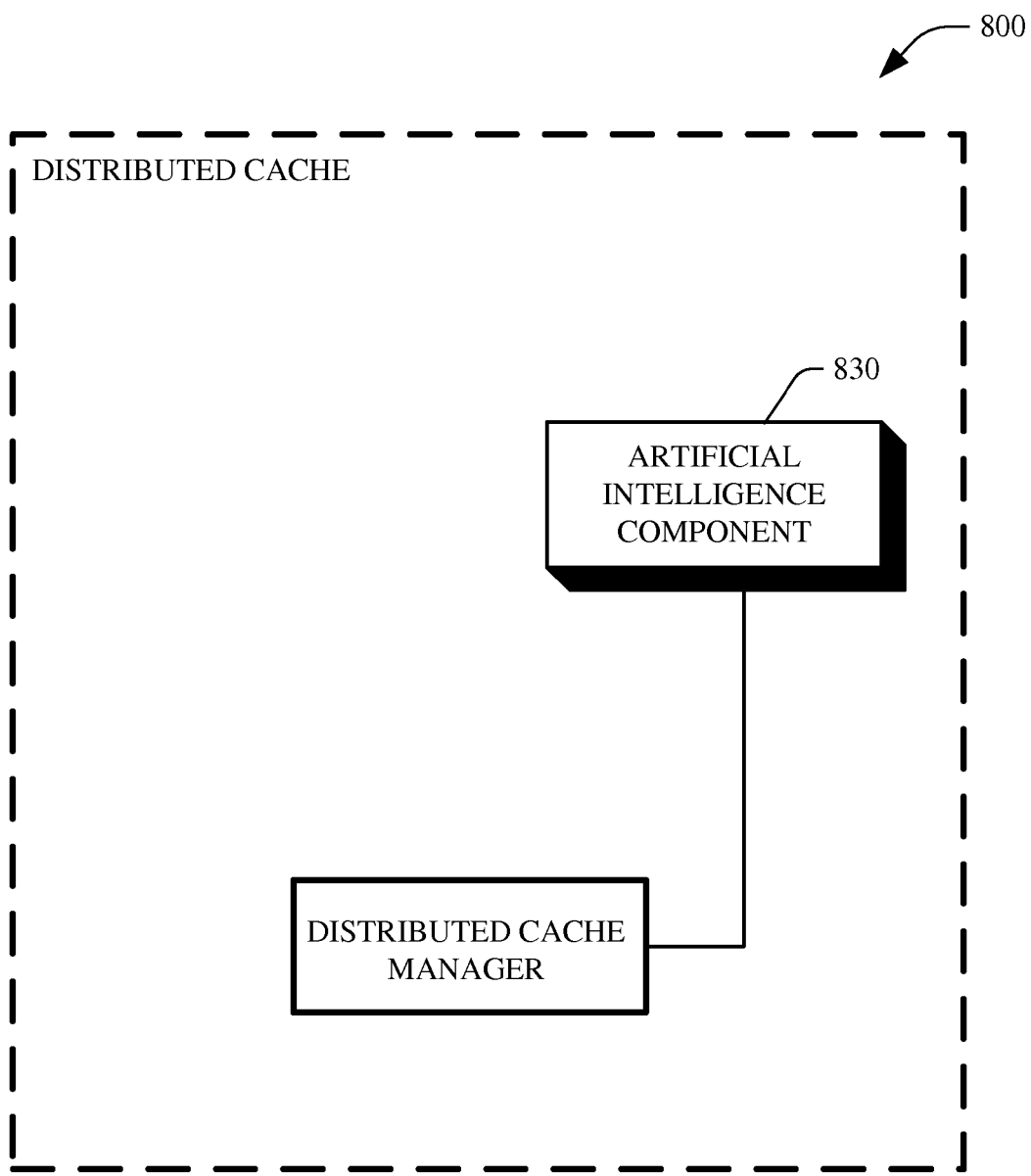
FIG. 8 illustrates an artificial intelligence (AI) component that can be employed to facilitate inferring and/or determining when, where, how to cache data in a distributed environment according to an aspect of the subject innovation.

FIG. 8 illustrates an artificial intelligence (AI) component 830 that can be employed to facilitate inferring and/or determining when, where, how to scale the distributed cache and/or distribute applications data therebetween. For example, such artificial intelligence component 830 can supply additional analysis with the distributed cache manager to improve distribution and/or scaling of the system. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The AI component 830 can employ any of a variety of suitable AI-based schemes as described supra in connection with facilitating various aspects of the herein described invention. For example, a process for learning explicitly or implicitly how or what candidates are of interest, can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, x=(x1, x2, x3, x4, xn), to a confidence that the input belongs to a class—that is, f(x)=confidence(class). Moreover, a rule based mechanism can further be employed for interaction of a routing manager and a routing layer associated therewith (e.g., load balancing, memory allocation and the like).

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
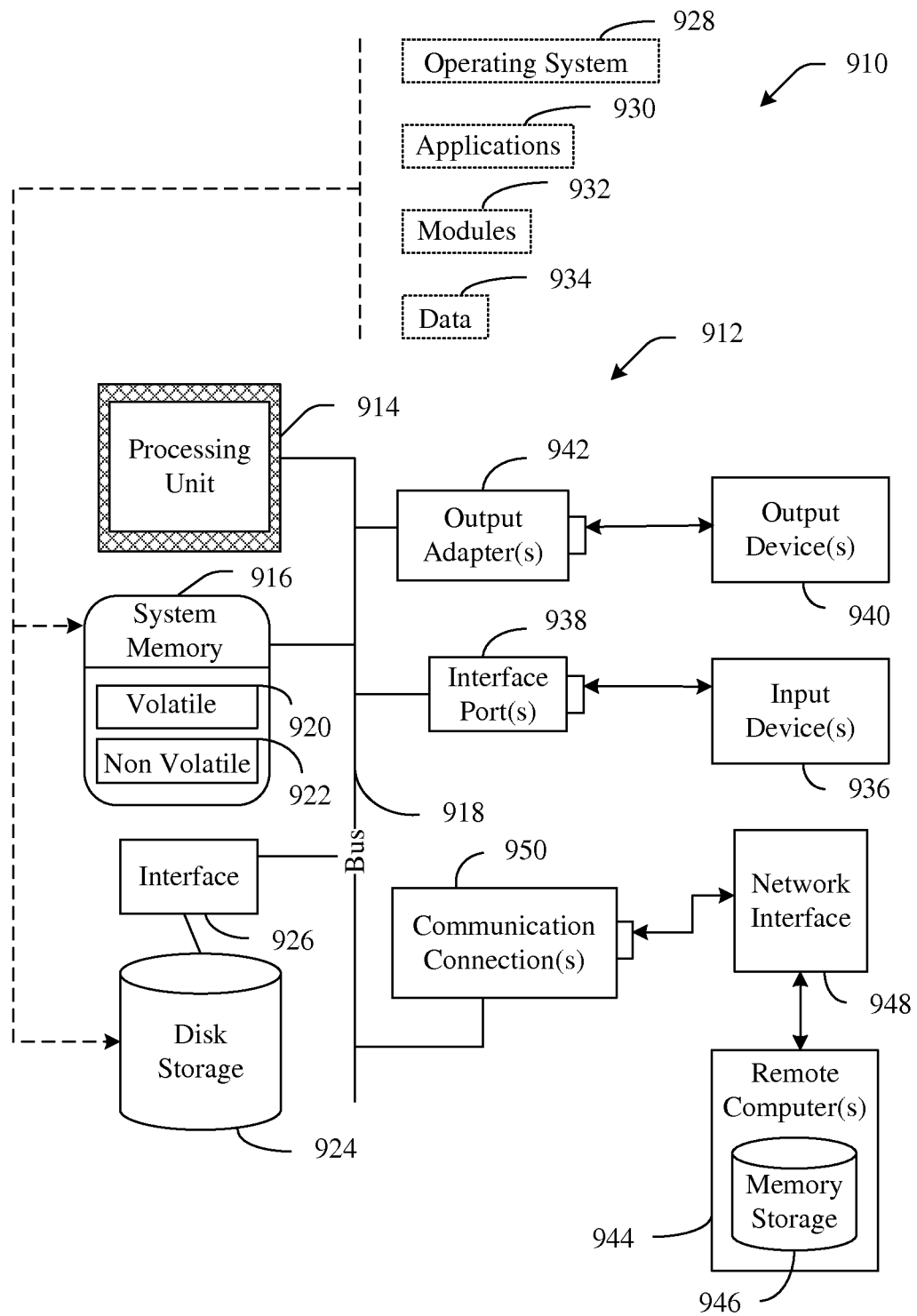
FIG. 9 illustrates an exemplary environment for implementing various aspects of the subject innovation.
Figure 10:
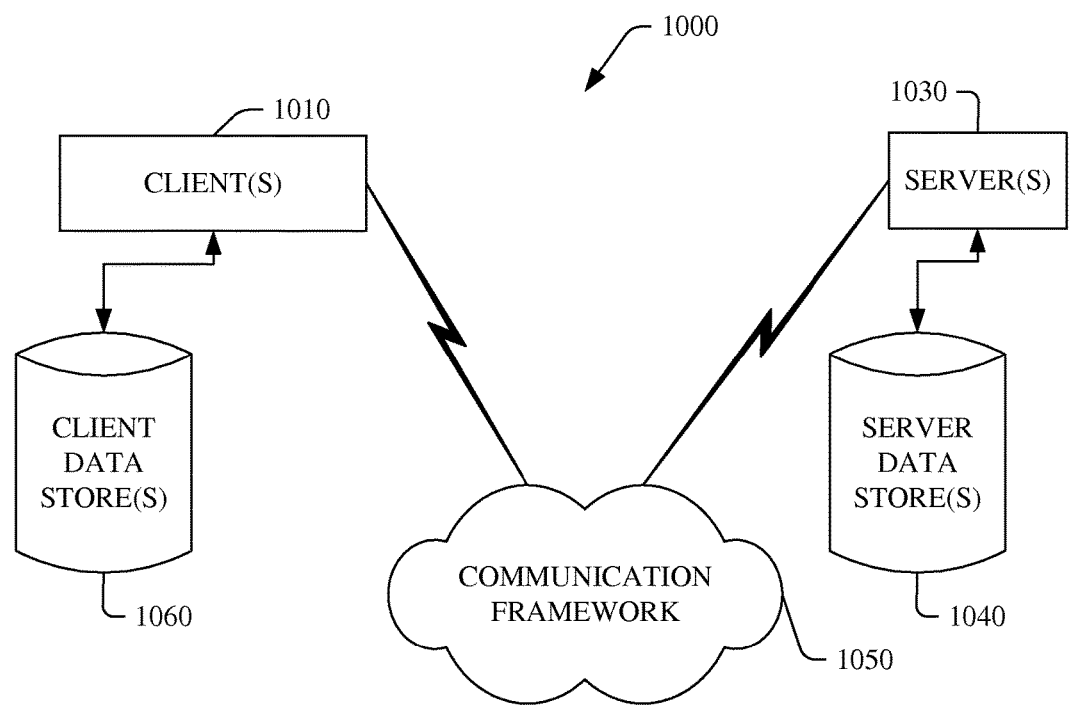
FIG. 10 is a schematic block diagram of a sample-computing environment that can be employed for distributing cache according to an aspect of the subject innovation.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules.

As used in this application, the terms "component", "system", "engine" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 9, an exemplary environment 910 for implementing various aspects of the subject innovation is described that includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates a disk storage 924, wherein such disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards. FIG. 10 is a schematic block diagram of a sample-computing environment 1000 that can be employed for distributing cache according to an aspect of the subject innovation. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 630.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

We claim:

1. A computer system comprising:
   at least one processor; and
   memory comprising instructions stored thereon that when executed by at least one processor cause the at least one processor to perform acts comprising:
      aggregating storage spaces distributed across a plurality of computer nodes to form a unified distributed cache;
      storing data in the unified cache;
      defining a plurality of regions in the distributed cache, wherein a given node is to store a complete copy of data assigned to a given region of the plurality of regions; and
      in response to a request to store one or more units of data in the given region, triggering storage of the one or more units of data in the given node.

2. The computer system of claim 1, wherein the unified distributed cache is distributed over storage spaces in multiple physical computing machines.

3. The computer system of claim 2, wherein each of the computer nodes of the cache is hosted on a different physical machine of the multiple physical computing machines.

4. The computer system of claim 1, wherein the data operation is an eviction operation.

5. The computer system of claim 1, wherein the distributed cache includes a plurality of named caches, wherein at least one of the named caches includes at least two of the regions, and wherein at least one region of the plurality of regions contains a plurality of cached data items.

6. The computer system of claim 1, wherein the data operation is performed using a hash table.

7. The computer system of claim 1, wherein at least one of the plurality of regions is defined explicitly by an application using the cache.

8. The computer system of claim 1, wherein at least one of the plurality of regions is implicitly created by the distributed cache.

9. A computer system comprising:
   at least one processor; and
   memory comprising instructions stored thereon that when executed by at least one processor cause at least one processor to perform acts comprising:
      aggregating storage spaces distributed across a plurality of computer nodes to form a unified cache;
      storing data in the unified cache, storing the data in the unified cache comprising receiving from an application, which uses the cache for storage of data for the application, one or more requests to store objects in a region in the unified cache, the unified cache guaranteeing colocation of the objects in the region in a single node of the plurality of nodes; and
      dispatching a request for access to the data to a designated primary node of the plurality of nodes.

10. The computer system of claim 9, wherein the unified cache is distributed over storage spaces in multiple physical computing machines.

11. The computer system of claim 10, wherein each of the nodes of the cache is hosted on a different physical machine of the multiple physical computing machines.

12. The computer system of claim 9, wherein the acts further comprise redistributing loads across a cluster of the plurality of nodes.

13. The computer system of claim 9, wherein the acts further comprise organizing the unified cache as an explicit cache tier.

14. The computer system of claim 9, wherein the acts further comprise adapting the unified cache via pluggable features.

15. The computer system of claim 9, wherein the acts further comprise arranging components for management of the unified cache in operational layers.

16. The computer system of claim 9, wherein the acts further comprise implementing the unified cache as part of an embedded application topology model.

17. The computer system of claim 9, wherein the acts further comprise inferring a manner of distributing the unified cache across the plurality of nodes via an intelligence component.

18. At least one computer-readable storage medium comprising at least one of a memory, disk, or disc, having instructions stored therein, the instructions configured to, in response to execution by one or more computing devices, cause the one or more computing devices to perform operations, the operations comprising:
   aggregating storage spaces distributed across a plurality of computer nodes to form a unified cache;
   storing data in the unified cache, storing the data in the unified cache comprising receiving from an application, which uses the cache for storage of data for the application, one or more requests to store objects in a region in the unified cache, the unified cache guaranteeing colocation of the objects in the region in a single node of the plurality of nodes; and
   dispatching a request for access to the data to a designated primary node of the plurality of nodes.

19. The at least one computer-readable storage medium of claim 18, wherein the unified cache is distributed over storage spaces in multiple physical computing machines.

20. The at least one computer-readable storage medium of claim 19, wherein each of the nodes of the cache is hosted on a different physical machine of the multiple physical computing machines.

* * * * *